United States Patent [19]

Fussell, Jr.

[11] 3,732,731

[45] May 15, 1973

[54] BLUFF BODY FLOWMETER WITH INTERNAL SENSOR

[75] Inventor: Theodore John Fussell, Jr., Bound Boook, Bridgewater Township, Somerset County, N.J.

[73] Assignee: Eastech, Inc., South Plainfield, N.J.

[22] Filed: Feb. 2, 1971

[21] Appl. No.: 111,829

[52] U.S. Cl. ............................................. 73/194 B
[51] Int. Cl. ............................. G01f 1/00, G01p 5/10
[58] Field of Search .................................... 73/194 B

[56] References Cited

UNITED STATES PATENTS

| 3,572,117 | 3/1971 | Rodely | 73/194 |
| 3,587,312 | 6/1971 | McMurtrie | 73/194 |
| 3,564,915 | 2/1971 | Tomota et al. | 73/194 |

FOREIGN PATENTS OR APPLICATIONS

| 44/1905 | 1/1969 | Japan | 73/194 |

OTHER PUBLICATIONS

Sharpsteen, "Fluid Amplifier Measures Flow Velocity," in Control Engineering, January 1966, pg. 103.

Primary Examiner—Richard C. Queisser
Assistant Examiner—Herbert Goldstein
Attorney—F. W. Padden

[57] ABSTRACT

A bluff body flowmeter, including a bluff body having a planar base preferably disposed normal to fluid flow in a conduit and a pair of converging downstream surfaces, is provided in one embodiment with an elongated first aperture which extends between the downstream surfaces in the high turbulence flow zone. The longitudinal axis of the first aperture lies in a plane normal to the fluid flow and is itself normal to the transverse axis of the bluff body. In addition, the bluff body is provided with an elongated second aperture which communicates between the first aperture and the exterior of the conduit and which is adapted to receive a sensor for detecting fluid flow changes in the first aperture. In another embodiment, the bluff body base is convex in shape and the first and second apertures are located therein and the first aperture communicates with a periodic, low turbulence flow zone in order to improve signal quality. In still another embodiment, the longitudinal axis of the first aperture is disposed at an oblique angle to the transverse axis of the bluff body in order to detect vortex shedding at half its actual frequency.

12 Claims, 6 Drawing Figures

PATENTED MAY 15 1973　　　　3,732,731
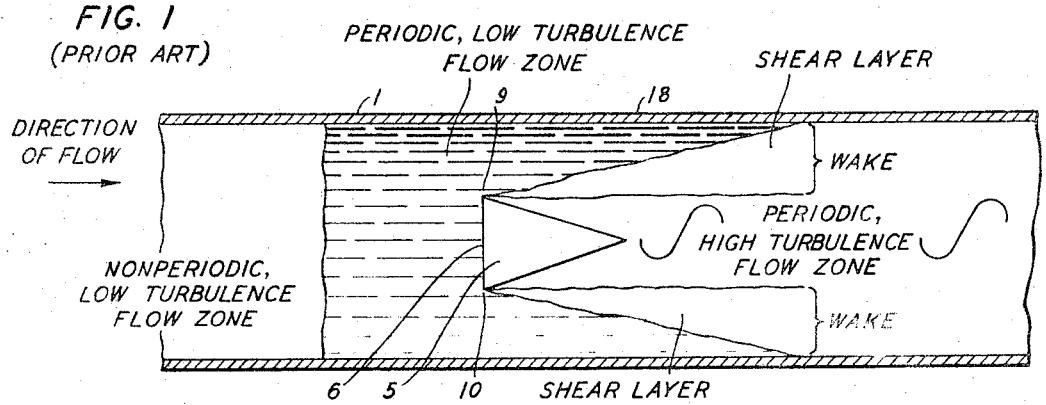
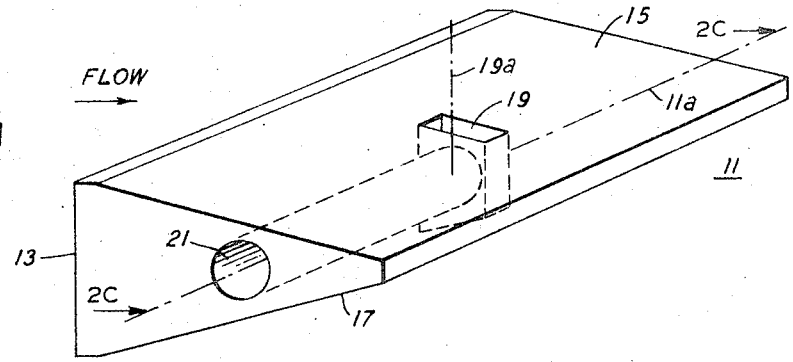
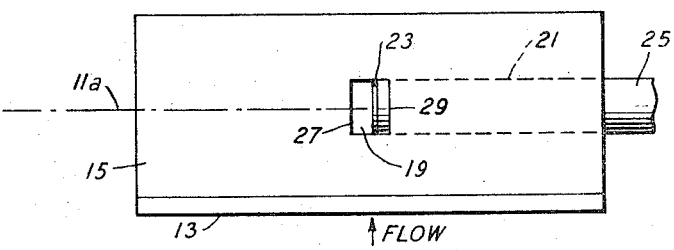
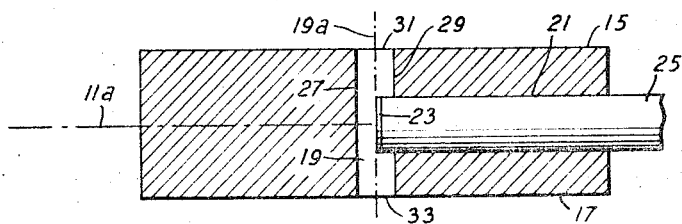
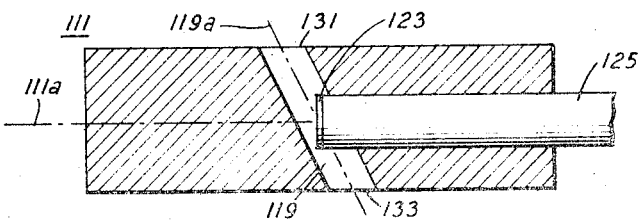
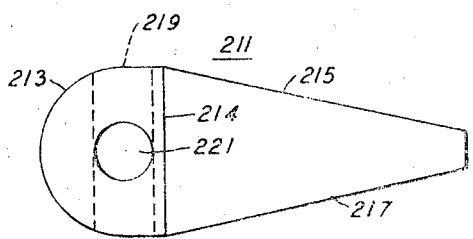
INVENTOR
THEODORE J. FUSSELL, JR.
BY
Frederick W. Padden
ATTORNEY

BLUFF BODY FLOWMETER WITH INTERNAL SENSOR

BACKGROUND OF THE INVENTION

This invention relates to flowmetering equipment and, more particularly, to improved bluff body flowmeters in which a sensor is located internal to the bluff body.

The development of flowmetering equipment has progressed in recent years to the point where devices are presently available for generating strong oscillatory fluid motion, free from intermittency, in fluid flowing through a conduit and for converting the oscillatory fluid motion into electrical pulses the repetition rate of which is related to the volumetric fluid flowrate. Copending U.S. patent application Ser. No. 732,238 of A.E.Rodely filed on May 27, 1968 (now U.S. Pat. No. 3,572,117), and assigned to the assignee hereof, describes a number of bluff bodies which produce strong, regular fluid oscillations and teaches that high signal-to-noise ratios are obtained with an appropriate sensor positioned to detect oscillatory fluid motion outside of a wake generated by the bluff body. In FIG. 7 of that patent application a probelike sensor is shown mounted through an opening in the conduit wall to detect fluid motion in the periodic, low turbulence flow zone outside of the wake. In general, neither the probe-like sensor nor the subsequently-to-be-described integral differential sensor arrangement have been used in the wake (i.e., the periodic, high turbulence flow zone directly downstream of a bluff body) because the noise levels there are so high that high quality signals are difficult to obtain.

In addition, the use of a probe-like sensor has numerous disadvantages including: (1) the need for a multitude of access holes in the conduit wall for the bluff body and sensors each with its own bolting and sealing arrangement; (2) the fragility of a device which projects into the fluid stream and (3) the difficulty in utilizing such sensors in phase detection schemes. These problems are discussed in greater detail in copending U.S. application Ser. No. 786,615 of C. L. McMurtrie and A. E. Rodely filed on Dec. 24, 1968 (now U.S. Pat. No. 3,587,312) and assigned to the assignee hereof. One solution taught by the latter application is the use of a differential sensor arrangement in which the sensors are mounted on the bluff body base and are made an integral part thereof. This invention has effectively reduced the cost and complexity of bluff body flowmeters while providing for accurate measurement of fluid flow in a conduit, especially in dirty and noisy flowstreams. While, therefore, the aforementioned invention represents a significant advance in the flowmetering art, several problems remain, and so there is still room for improvement.

More particularly, in a flowmeter in which the sensors are integral to the bluff body, when a sensor becomes dirty or damaged, or deteriorates for any reason, it is necessary to stop fluid flow in the conduit before the bluff body, and hence the sensor, can be removed for repair or replacement. In addition, the flowmeter is generally not readily field serviceable; that is, the entire bluff body including sensors must be returned to the manufacturer for servicing thereby increasing the down-time of the flowmeter.

Moreover, the need to use two sensors in the bridge circuit of a differential sensor arrangement (in order to obtain a high amplitude, low noise signal) presents a unique difficulty in that a replacement sensor must be matched to the remaining sensor in order for the bridge to be electrically balanced under no-signal conditions.

It is therefore an object of my invention to detect oscillatory fluid motion created by a bluff body in a flowstream.

It is another object of my invention to detect oscillatory fluid motion in a high turbulence flow zone created by such a bluff body.

It is still another object of my invention to perform such detection with a single sensor.

It is yet another object of my invention to improve the field serviceability of a bluff body flowmeter by rendering the sensor removable from the bluff body without requiring the removal of the bluff body itself from the conduit.

SUMMARY OF THE INVENTION

These and other objects are accomplished in accordance with an illustrative embodiment of my invention, a bluff body flowmeter in which the bluff body includes a planar bluff body base disposed normal to fluid flow in a conduit and a pair of converging downstream surfaces provided with a first elongated aperture extending therebetween. The longitudinal axis of the aperture lies in a plane normal to the fluid flow and is itself normal to the transverse axis of the bluff body. In addition, the bluff body is provided with an elongated second aperture which communicates between the first aperture and the exterior of the conduit and is adapted to receive a removable sensor at the region of intersection of the two apertures.

In operation, as fluid flows around the base of the bluff body, vortex shedding occurs along the downstream faces. These vortices produce changes in pressure in the fluid which fills the first aperture thereby producing a corresponding electrical signal via the sensor. The frequency or repetition rate of the electrical signal is proportional to the actual vortex shedding frequency since the sensor is responsive to vortex induced changes at both ends of the first aperture.

In high velocity fluid flow systems, such as gas systems, the shedding frequency may be so high that responsive electrical equipment may be difficult or expensive to construct. This problem is alleviated in another embodiment of my invention in which the longitudinal axis of the first aperture is oriented at an oblique angle to the transverse axis of the bluff body resulting in the measurement of only half the actual vortex shedding frequency.

While it is a feature of my invention that the aforementioned embodiments may be utilized with the first aperture opening into the high turbulence flow zone directly downstream of the bluff body base, signal quality is improved by constructing the base in a conical shape and locating the first and second apertures so that the first aperture communicates with a low turbulence flow zone.

Each of the embodiments of my invention is readily serviced while in the field. When, for example, the sensor typically mounted on a holder in the second aperture requires servicing, it may be removed from the bluff body via the holder without requiring removal of the bluff body itself from the conduit, and, if hot tapping techniques are used, the conduit need not be shut down. This simple procedure advantageously allows a flowmeter user to stock sensors which can be used as ready replacements for dirty or damaged ones removed from the bluff body. As a result, flowmeter down-time is considerably reduced as are costs attendant to having to remove the entire bluff body for repair by the manufacturer, or having to shut down the conduit during sensor replacement.

BRIEF DESCRIPTION OF THE DRAWING

The above and other objects of the invention, together with its various features and advantages, can be easily understood from the following more detailed discussion, taken in conjunction with the accompanying drawings, in which:

FIG. 1 shows schematically the flow zones created by a bluff body in a conduit;

FIGS. 2A and 2B show respectively isometric and top views of a bluff body flowmeter in accordance with one embodiment of my invention;

FIG. 2C is a sectional view taken along line 2C—2C of FIG. 2A;

FIG. 3 is a sectional view analogous to FIG. 2C of a third embodiment of my invention for decreasing the detected vortex shedding frequency; and FIG. 4 is a schematic side view of a second embodiment of my invention for detection in a low turbulence flow zone.

DETAILED DESCRIPTION

Before discussing my invention it will be helpful to review the manner in which a bluff body interacts with fluid flowing in a conduit. As shown in FIG. 1, a bluff body 5 having a triangular cross section is mounted along a diameter of pipe 1. A facing surface or base 6 of body 5 interacts with fluid flowing in the pipe 1 to produce an oscillating wake; i.e., that region bounded by and including the shear layers which separate the periodic, high turbulence flow zone behind body 5 from the periodic, low turbulence flow zone outside thereof. The wake zone commences proximate the sharp edged corners 9 and 10 of body 5 and spreads downstream from body 5 until it fills the entire pipe 1. In the upstream direction from body 5, the signals detectable in front of body 5 get progressively weaker upstream and become almost completely buried in the turbulent flow fluctuations at approximately one bluff body length upstream from body 5. In copending application Ser. No. 732,238 (now U.S. Pat. No. 3,572,117) a probe-like sensor is typically mounted in the pipe wall at location 18 in the periodic, low turbulence flow zone outside of the wake. In copending application Ser. No. 786,615 (now U.S. Pat. No. 3,587,312), on the other hand, a pair of differential sensors are integrally mounted in the facing surface or base 6 of body 5.

To achieve nonintermittency in the oscillating fluid flow the former application teaches that the ratio of the axial length of bluff body 5 to the height of base 6 is advantageously between 1 and 2, and the ratio of the height of base 6 to the inner diameter of pipe 1 is advantageously between 0.15 and 0.4. Moreover, a dimensional length between a frontmost surface of the base 6 to its sharp corner edges with respect to that of the height of the base is of a ratio of 0.3 or less. In such bluff bodies with a convex base (FIG. 4 herein), the ratio of the axial length (axial length of the side surfaces of the bluff body plus the axial dimensional length between the frontmost surface of the base 6 to its sharp corner edges with respect to that of the height of the base is of a ratio of 0.3 or less. In such bluff bodies with a convex base (FIG. 4 herein), the ratio of the axial length (axial length of the side surfaces of the bluff body plus the axial dimensional length between the frontmost surface of the base to its corner edges) to the base height is advantageously between 1 and 2.

These criteria are advantageously satisfied in my invention, a bluff body flowmeter as shown in one embodiment in FIGS. 2A–2C. The bluff body 11, which is typically mounted along a diameter of a conduit (not shown) and between the walls thereof, comprises a base surface 13 disposed preferably normal to the direction of fluid flow in the conduit and a pair of converging downstream surfaces 15 and 17. The cross section of bluff body 11 therefore, as shown in FIG. 2A, is substantially triangular. In order to detect oscillatory fluid motion, the body 11 is provided with an elongated first aperture 19 extending between the downstream surfaces 15 and 17 in a high turbulence flow zone. Note that aperture 19 is located downstream of the edges of base surface 6 where, as described in the aforementioned U.S. Pat. No. 3,572,117, the boundary layers of the fluid separate from the bluff body to produce vortex shedding. The longitudinal axis 19a of aperture 19 lies in a plane normal to the fluid flow and is itself normal to the transverse axis 11a which extends along the elongated dimension of bluff body 11. In addition, body 11 is provided with an elongated second aperture 21 illustratively having its longitudinal axis parallel to the transverse axis 11a. Aperture 21 communicates between first aperture 19 and the exterior of the conduit (not shown) and is adapted to receive a sensor 23 for the detecting fluid flow changes in the first aperture 19. As shown in FIG. 2B, sensor 23 is mounted at the end of a shaft 25 inserted into second aperture 21 so that sensor 23 is disposed in first aperture 19. For optimum sensitivity sensor 23 is disposed intermediate the sides 27 and 29 of aperture 19, the precise position being empirically determined. For example, placing sensor 23 too close to side 27 may constrict the flow of fluid through aperture 19 and thereby reduce sensitivity. It should be noted that the sensor may be one of several well known types including, by way of example, a suitable force, pressure, velocity, displacement, temperature or density sensor presently available in the art.

In operation, as fluid (e.g., gas or liquid) flows around the base 13 of bluff body 11, vortex shedding occurs along the downstream surfaces 15 and 17. These vortices produce changes in pressure and velocity in the fluid which fills first aperture 19 thereby producing a corresponding electrical signal via sensor 23. Thus, for example, where sensor 23 comprises a thermistor, the temperature induced resistivity changes therein produce electrical pulses which are coupled by electrical leads (not shown) which pass through shaft 25 (which is typically hollow) to appropriate electronic detection circuitry (e.g., an amplifier, a compensating network and a filter). In this embodiment, the frequency or repetition rate of the electrical pulses is proportional to the actual vortex shedding frequency (and hence the flowrate) since sensor 23 is responsive to vortex induced changes at both ends 31 and 33 (FIG. 2C) of first aperture 19.

Where the vortex shedding frequency is so high, as in high velocity gas flow systems, that design considerations dictate the desirability of operating associated electronic equipment at lower frequencies, it may be desirable to employ an alternate embodiment of my invention shown in FIG. 3. In this case, the bluff body 111 is identical to that previously described with reference to FIGS. 2A–2C except that the longitudinal axis 119a of first aperture 119 is oriented at an oblique angle to the transverse axis 111a of the bluff body 111. The effect of this angle is that the face of sensor 123 is exposed directly to fluid flowing into end 131 of aperture 119 but is shaded by the end portion of shaft 125 from direct exposure to fluid flowing into end 133 of aperture 119. Consequently, sensor 123 is effectively responsive only to half the vortex induced changes. The measured electrical signal frequency is therefore one-half the actual vortex shedding frequency.

It should be noted that good signal quality is obtained in my invention without the use of a pair of sensors in an electrical bridge and notwithstanding the fact that sensor 23 (or 123) is located nearto and communicating with a high turbulence flow zone where noise levels are high. If, however, it is desired to further improve signal quality, the first and second apertures may be disposed in a low turbulence flow zone by modifying the bluff body design. Thus, as shown in FIG. 4, bluff body 211 includes a convex base 213 and converging downstream surfaces 215 and 217. First aperture 219 is located in the convex portion of the body 211 as is second aperture 221. Inasmuch as the wake begins proximate to line 214 and extends downstream, it can readily be seen that this embodiment locates the sensor in a low turbulence flow zone and still retains the advantages of the previously described bluff body embodiments employing planar bases.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

What is claimed is:

1. For use in measuring the flowrate of fluid in conduit, a bluff body comprising a planar base surface disposed substantially normal to the direction of fluid flow effective to produce vortex shedding in said fluid, said surface extending along a diameter of said conduit and between the walls thereof, a pair of planar converging surfaces extending downstream of said base surface forming a substantially triangular cross section of said body, said body having a transverse axis and an elongated first aperture extending between said converging surfaces, the longitudinal axis of said first aperture lying in a plane substantially parallel to said base surface and being substantially normal to said transverse axis of said body, an elongated second aperture communicating between said first aperture and the exterior of said conduit, the longitudinal axis of said second aperture being substantially parallel to said base surface, said second aperture being adapted to receive at least one removable sensor holder with a sensor responsive to vortex induced changes in said first aperture, the ratio of the axial length of said body to the height of said base surface being between 1 and 2 and the ratio of the height of said base surface to the inner dimension of said conduit transverse to the longitudinal axis thereof being between 0.15 and 0.4, and a removable, elongated sensor holder adapted to fit into said second aperture, a sensor mounted on the end of said holder inserted into said body, said holder being inserted so that said sensor is positioned within said first aperture.

2. An elongated vortex shedding body having a transverse axis extending along the elongated dimension thereof for use in measuring the flowrate of fluid in a conduit comprising a base surface disposed substantially normal to the direction of fluid flow, a pair of converging surfaces extending downstream from said base surface and meeting said base surface along a pair of edges, said base and converging surfaces being mutually adapted so that the boundary layers of said fluid separate from said body at said edges and so that vortex shedding is free from intermittency, and characterized in that a first aperture extends through said body and is oriented substantially transverse to the direction of fluid flow in order to receive a portion of said fluid flowing in said conduit, said first aperture extending between said converging surfaces and being located in a region relatively remote from said edges where said boundary layers of said fluid separate from said body so that fluid flow in said first aperture has a relatively high signal-to-noise ratio, and further characterized in that a second aperture communicates between said first aperture and the exterior of said conduit, said second aperture being adapted to receive at least one removable sensor responsive to vortex induced changes in said fluid flow in said first aperture, and a removable sensor is located proximate to an intersection of said first and second apertures for sensing fluid vortex induced changes in said first aperture.

3. The body of claim 2 wherein the longitudinal axis of said first aperture is substantially normal to the transverse axis of said body.

4. The body of claim 3 wherein said base surface is planar and the longitudinal axis of said first aperture lies in a plane substantially parallel to said base surface.

5. The body of claim 4 wherein said base and converging surfaces are planar and the longitudinal axis of said second aperture is substantially parallel to all of said surfaces.

6. The body of claim 5 wherein the crossection of said body is substantially triangular.

7. The body of claim 6 in combination with a holder adapted for insertion in said second aperture, said sensor being mounted on the end of said holder inserted into said second aperture, said holder being positioned so that said sensor is located within said first aperture.

8. The body of claim 2 wherein the longitudinal axis of said first aperture is oriented at an oblique angle to the transverse axis of said body effective to measure approximately one half the actual vortex shedding frequency.

9. The body of claim 8 wherein said base surface is planar and the longitudinal axis of said first aperture lies in a plane substantially parallel to said base surface.

10. The body of claim 9 wherein said base and converging surfaces are planar and the longitudinal axis of said second aperture is substantially parallel to all of said surfaces.

11. The body of claim 10 wherein the crossection of said body is substantially triangular.

12. The body of claim 11 in combination with a holder adapted for insertion in said second aperture, at least one sensor mounted on the end of said holder inserted into said second aperture, said holder being positioned so that said sensor is located within said first aperture.

* * * * *